US012551803B2

(12) United States Patent
Isgar

(10) Patent No.: US 12,551,803 B2
(45) Date of Patent: Feb. 17, 2026

(54) WORD GAME SYSTEM

(71) Applicant: Charles Isgar, Scottsdale, AZ (US)

(72) Inventor: Charles Isgar, Scottsdale, AZ (US)

( * ) Notice: Subject to any disclaimer, the term of this patent is extended or adjusted under 35 U.S.C. 154(b) by 207 days.

(21) Appl. No.: 18/190,301

(22) Filed: Mar. 27, 2023

(65) Prior Publication Data

US 2024/0325935 A1 Oct. 3, 2024

(51) Int. Cl.

| | |
|---|---|
| ***A63F 13/847*** | (2014.01) |
| ***A63F 13/35*** | (2014.01) |
| ***A63F 13/44*** | (2014.01) |
| ***A63F 13/46*** | (2014.01) |
| ***A63F 13/537*** | (2014.01) |
| ***A63F 13/79*** | (2014.01) |

(52) U.S. Cl.

CPC ............ *A63F 13/847* (2014.09); *A63F 13/35* (2014.09); *A63F 13/44* (2014.09); *A63F 13/46* (2014.09); *A63F 13/537* (2014.09); *A63F 13/79* (2014.09)

(58) Field of Classification Search

CPC ........ A63F 13/847; A63F 13/35; A63F 13/44; A63F 13/46; A63F 13/537; A63F 13/79

USPC ........................................................ 463/9

See application file for complete search history.

(56) References Cited

U.S. PATENT DOCUMENTS 10,478,729 B1 * 11/2019 Wells .................... A63F 13/352
2005/0250575 A1 * 11/2005 Kane ....................... G07F 17/32 463/17
2006/0155597 A1 * 7/2006 Gleason ................. G06Q 30/02 705/14.27
2009/0005169 A1 * 1/2009 Pellegrinelli ....... G07F 17/3276 463/43
2011/0228227 A1 * 9/2011 Roser ..................... A61B 3/032 351/239
2013/0054353 A1 * 2/2013 Tabor ................ G06Q 30/0207 705/14.49
2014/0236733 A1 * 8/2014 Cho ....................... G06Q 50/01 705/14.66
2015/0290552 A1 * 10/2015 Owoc ................... A63F 3/0423 472/75
2017/0001103 A1 * 1/2017 Starley ...................... A63F 9/30
2020/0108315 A1 * 4/2020 Wells ....................... A63F 13/35
2022/0246056 A1 * 8/2022 Kodadek, III ........... G09B 5/02
2025/0047753 A1 * 2/2025 Lettunich ........... G06Q 30/0208

* cited by examiner

*Primary Examiner* — Michael A Cuff

(74) *Attorney, Agent, or Firm* — Schmeiser Olsen & Watts

(57) ABSTRACT

Described is a word game system. The system includes a server having a memory storing user data and game data and a plurality of user computing devices coupled to the server. The system operates to create a team from the plurality of user computing devices that have accessed the system. The server may send a game interface to each of user computing devices that include blank spaces corresponding to a word determined by the server, wherein the number of letters correspond to the number of user computing devices. The server also sends a letter tile to each user computing device that correspond to the blank spaces. The team then operates to enter letter tiles into the blank spaces to form a word and the server automatically determines if the word spelled matches the word determined by the server.

13 Claims, 16 Drawing Sheets

WORD GAME SYSTEM

BACKGROUND OF THE INVENTION

Technical Field

This invention generally relates to a system for a word game, and more specifically to a word game system for play among a plurality of mobile devices.

State of the Art

There are several different types of word games available on apps of mobile devices. Conventionally, these word games allow for a user to engage in play in a single game as a single individual. Those word games that allow for multiple players are limited in scope and do not provide for players to interact in real life in order to play the game. Rather the conventional word games that allow for multi-player options require only digital interaction with the other players in order to engage in game play, thereby allowing for play by individuals who are remote from one another.

Accordingly, what is needed is a word game system for play among a plurality of mobile devices that provides for real life interaction between players in order to engage in the word game play.

SUMMARY OF THE INVENTION

An embodiment includes a word game system comprising: a server having a memory storing user data and game data; and a plurality of user computing devices coupled to the server, wherein the server is programmed to: receive a signal from the plurality of user computing devices comprising user data for each user computing device and location information of each user computing device; in response to receiving the signal from the plurality of user computing devices, process the user data and location data for each user computing device and establish a team formed of the plurality of user computing devices accessing the system within a predetermined proximity to each other; create and send for display on each of the plurality of user computing devices a game interface, wherein the game interface comprises blank spaces corresponding to letters of a word determined by the server, a timer, a score and letter tiles corresponding to the blank spaces, one letter tile per user computing device, and wherein the timer begins counting down; receive input of letter tiles into the blank spaces to form a word; and process the letter tile input into the blank spaces and compare to the word to determine if the team entered a correct word.

Another embodiment includes a word game system comprising: a server having a memory storing user data and game data; and a plurality of user computing devices coupled to the server, wherein the server is programmed to: receive a signal from the plurality of user computing devices comprising user data for each user computing device and a team code; in response to receiving the signal from the plurality of user computing devices, process the user data and the team for each user computing device and establish a team formed of the plurality of user computing devices accessing the system with the same team code; create and send for display on each of the plurality of user computing devices a game interface, wherein the game interface comprises blank spaces corresponding to letters of a word determined by the server, a timer, a score and letter tiles corresponding to the blank spaces, one letter tile per user computing device, and wherein the timer begins counting down; receive input of letter tiles into the blank spaces to form a word; and process the letter tile input into the blank spaces and compare to the word to determine if the team entered a correct word.

Another embodiment includes a word game system comprising: a server having a memory storing user data and game data; and a plurality of user computing devices coupled to the server, wherein the server is programmed to: receive a signal from the plurality of user computing devices include user data for each user computing device; in response to receiving the signal from the plurality of user computing devices, process the user data and establish a team formed of the plurality of user computing devices accessing the system; create and send for display on each of the plurality of user computing devices a game interface, wherein the game interface comprises blank spaces corresponding to letters of a word determined by the server, a score, and letter tiles corresponding to the blank spaces, one letter tile per user computing device; receive input of letter tiles from each of the plurality of user computing devices into the blank spaces to form a word; and process the letter tile input into the blank spaces and determine if the team entered a correct word.

The foregoing and other features and advantages of the invention will be apparent to those of ordinary skill in the art from the following more particular description of the invention and the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

Embodiments of the present invention relate to word game system for play among a plurality of mobile devices. The system may include the use of a mobile application operating on a user computing device that may be a mobile computing device like a smartphone, a tablet, a wearable, and the like; and/or the system may operate on any type of computing device as a downloadable application or even as a web application.

Figure 1A:
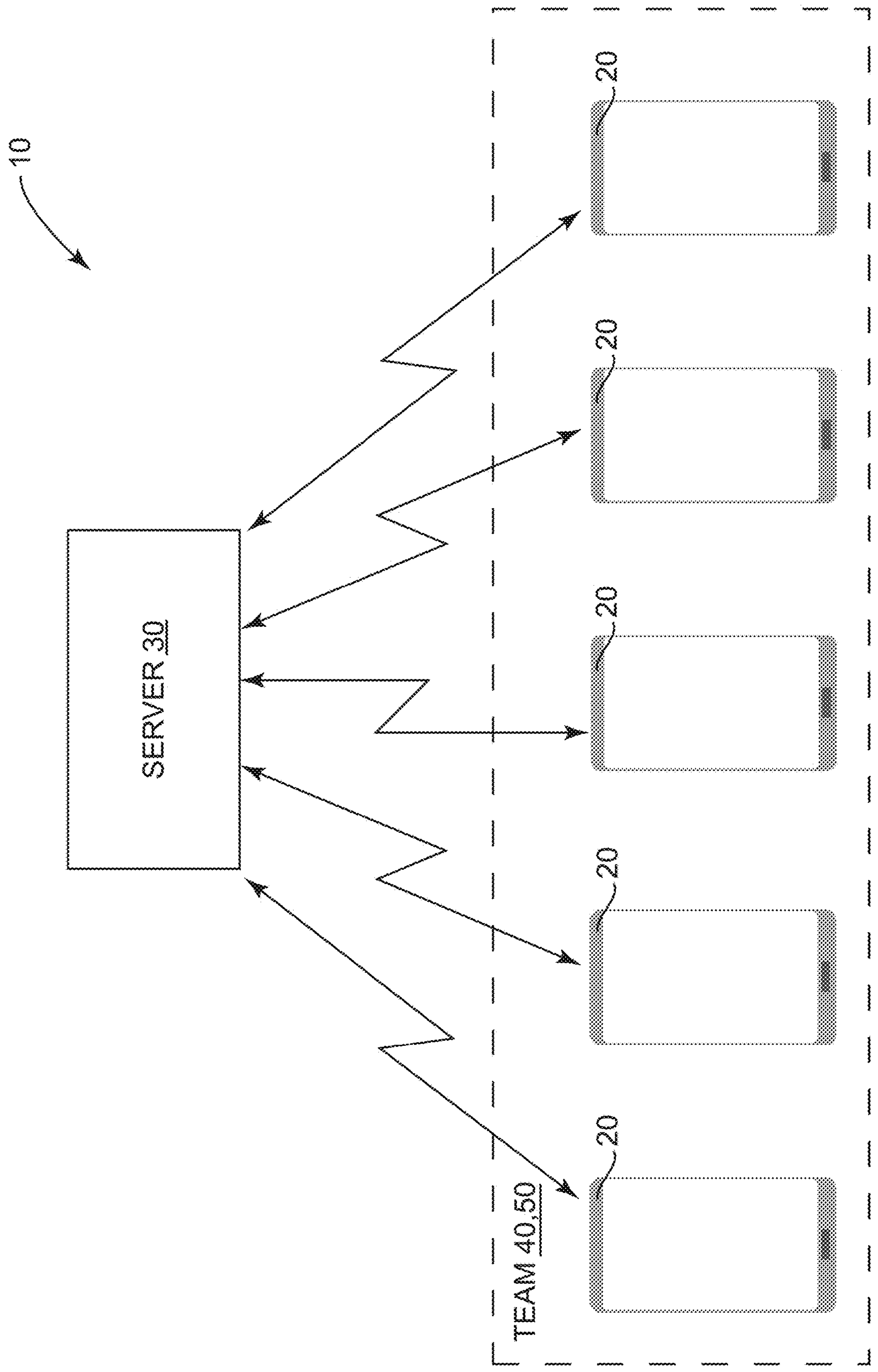
FIG. 1A is a diagrammatic view of a word game system according to an embodiment.

FIG. 1A depicts an embodiment of a word game system 10. The system 10 may include a plurality of user computing devices 20 and a server 30, wherein each user computing device 20 is coupled to the computer server 30. This coupling may be a network connection, such as a wireless connection through an Internet connection, a Wi-Fi connection, a Bluetooth connection or the like, wherein the user computing devices 20 may communicate with and receive communication from the server 30. The user computing devices 20 may include a desktop computer, a laptop, a tablet, a smartphone, wearable devices and the like. The server 30, in some embodiments, may be a computer server or a cloud-based infrastructure architecture.

The server 30 may include a memory storing user data and game data. The memory of the server 30 may store user data, such as a user name, a password, and profile information. It may also store game data such as, but not limited to words of various letter length for use with the game, timer settings and so forth.

Figure 2A:
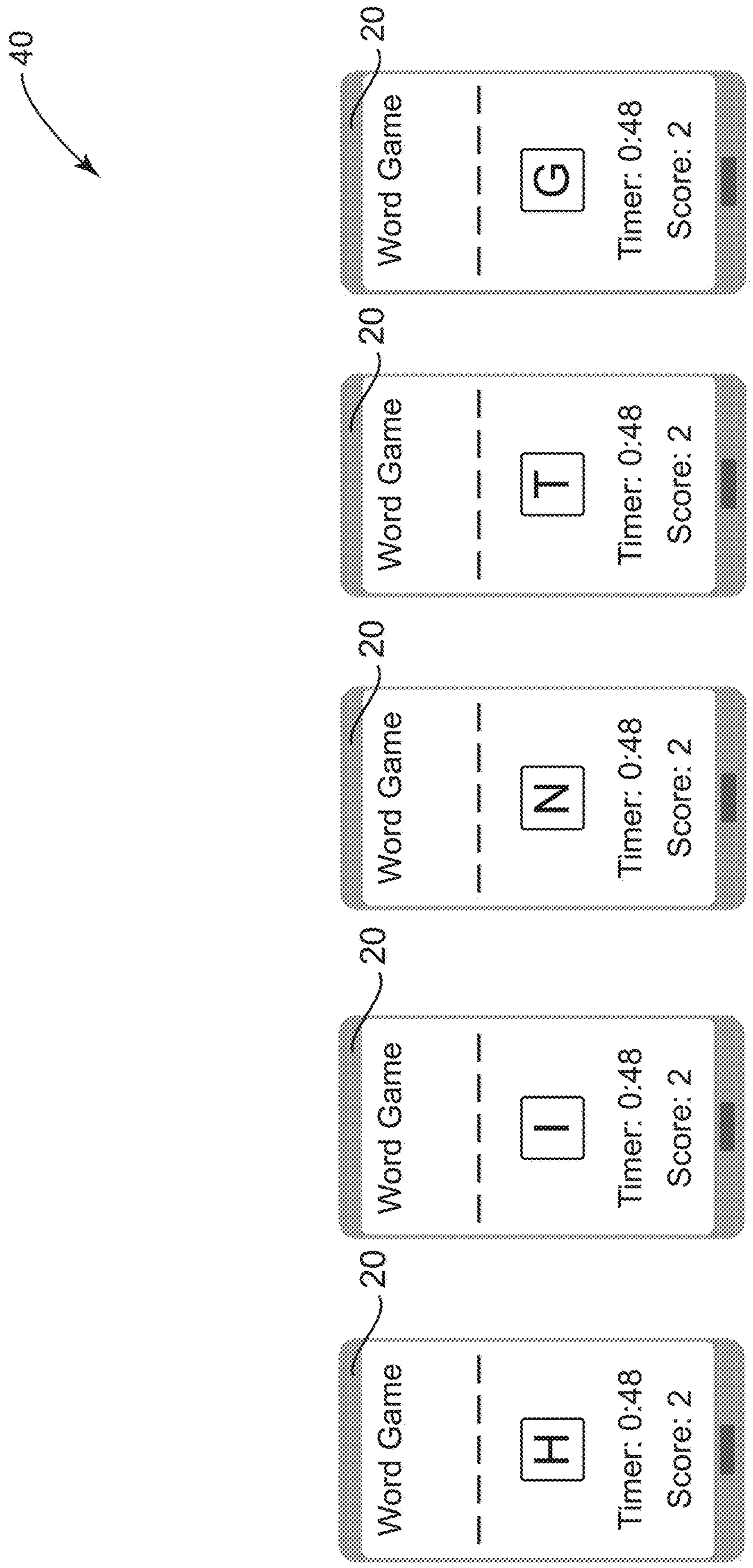
FIG. 2A is a view of user computing devices operating a word game system according to an embodiment.
Figure 2B:
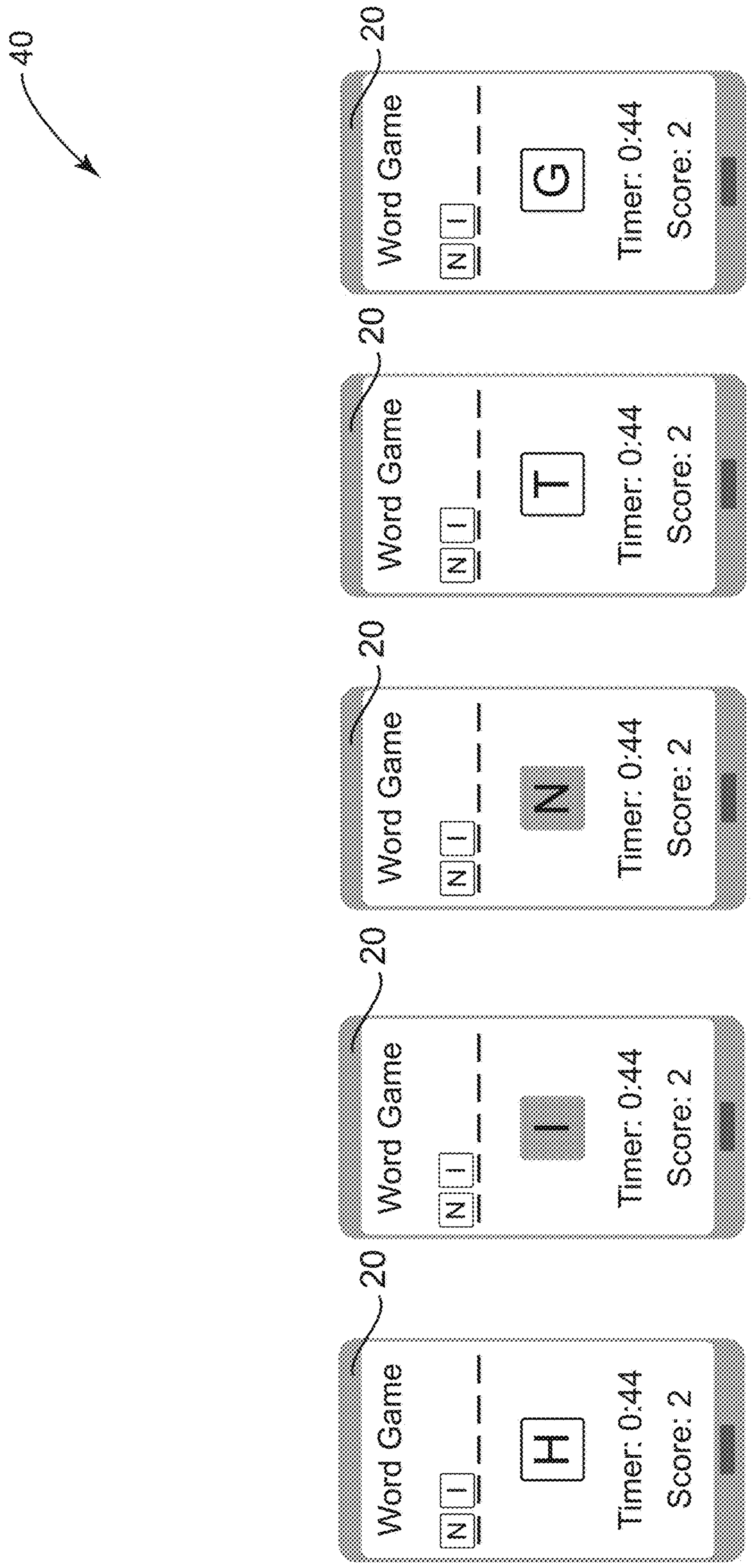
FIG. 2B is a view of user computing devices operating a word game system according to an embodiment.
Figure 2C:
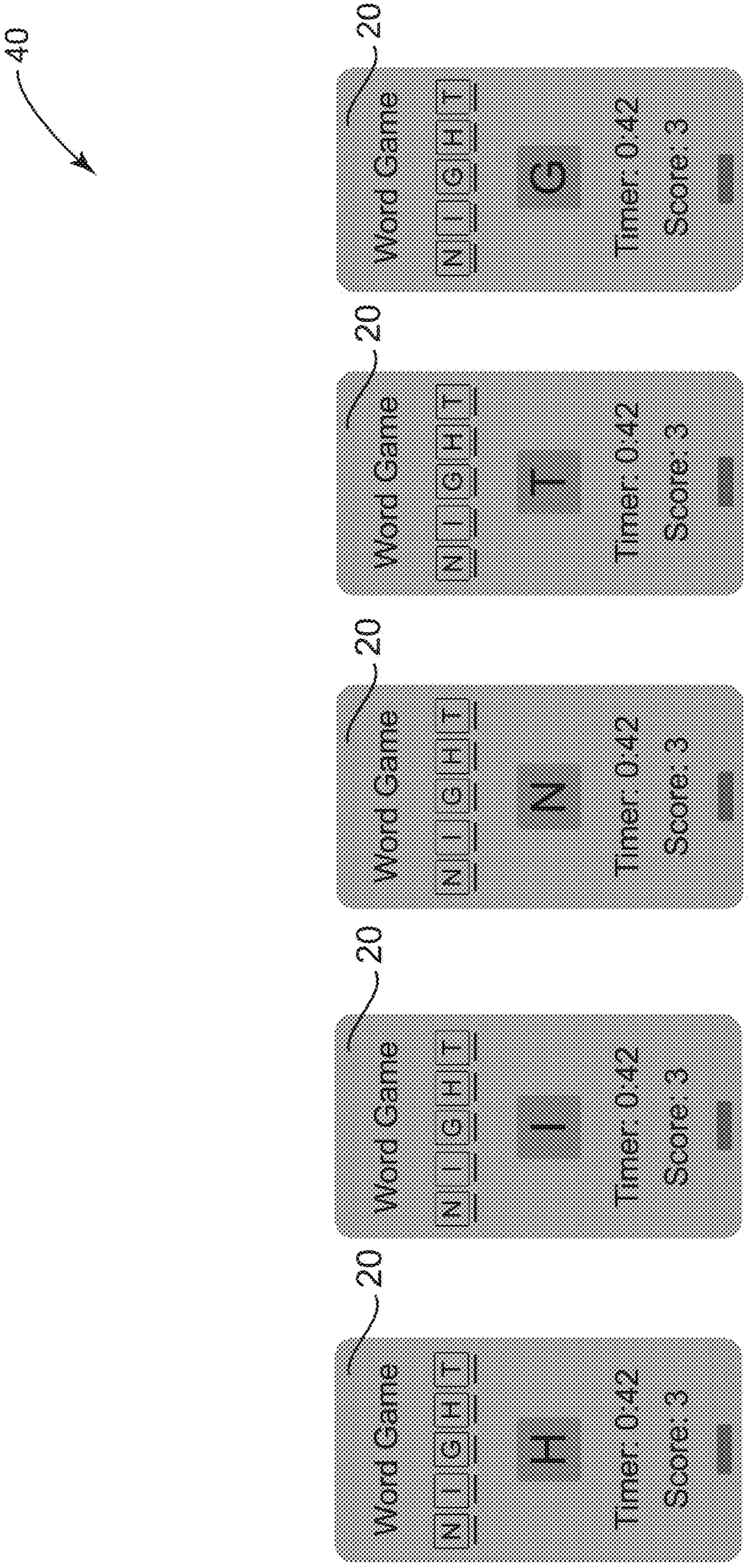
FIG. 2C is a view of user computing devices operating a word game system according to an embodiment.

Further, as shown in FIG. 1A, a plurality of user computing devices 20 may be coupled to the server 30, wherein the plurality of the user computing device 20 form a first team 40 of user computing devices 20. Referring additionally, to FIGS. 2A-2C, the server 30 may be programmed to receive a signal from the user computing devices 20 that each has accessed the system 10 and desire to be a team, such as first team 40. The signals may include user data and may also include location information of the user computing devices 20, such as by running a word game app on the user computing devices 20. The server 30 may then be programmed to in response to receiving the signal from the user computing device, process the user data and location data for each user computing device 20 and establish the first team 40 of user computing devices 20 accessing the system in the same location by determining various user computing devices 20 that have accessed the system and are within a predetermined proximity to each other, and create and send for display on the user computing device game interface. One of the user computing devices 20 from the first team 40 may then start the game. In another embodiment of the invention, the first team 40 may include user computing devices 20 accessing the system in different locations, wherein each user computing device 20 of the members of the first team 40 may be grouped as a team in various ways, such as but not limited to, each user computing device 20 sending a code, such as a team code, wherein all of the user computing devices 20 that access the system 10 and enter the same team code are grouped as a team by the system 10.

This allows for teams to be organized with team members in a same location or with team members in different locations.

Figure 10A:
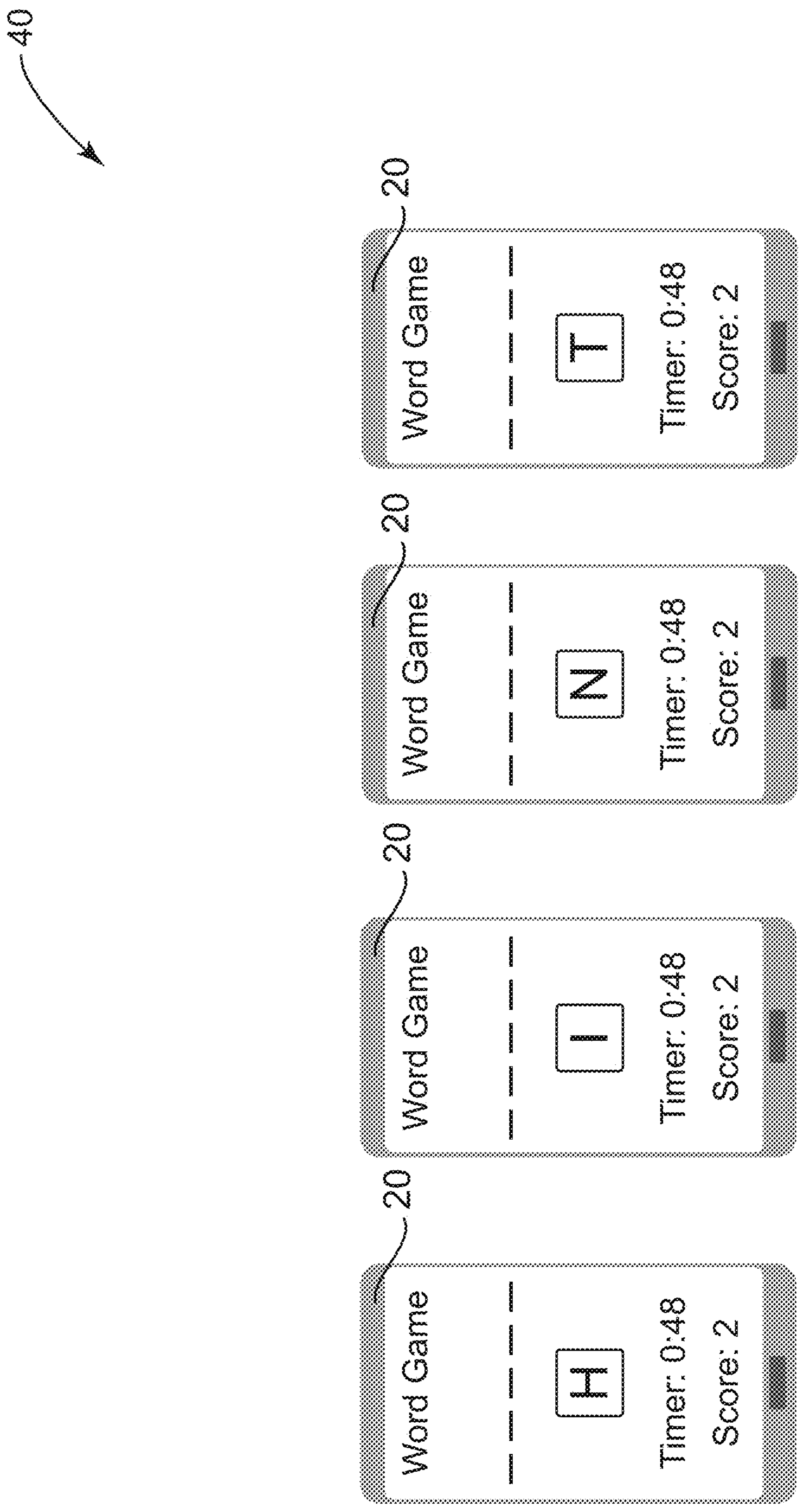
FIG. 10A is a view of user computing devices operating a word game system according to an embodiment.
Figure 10B:
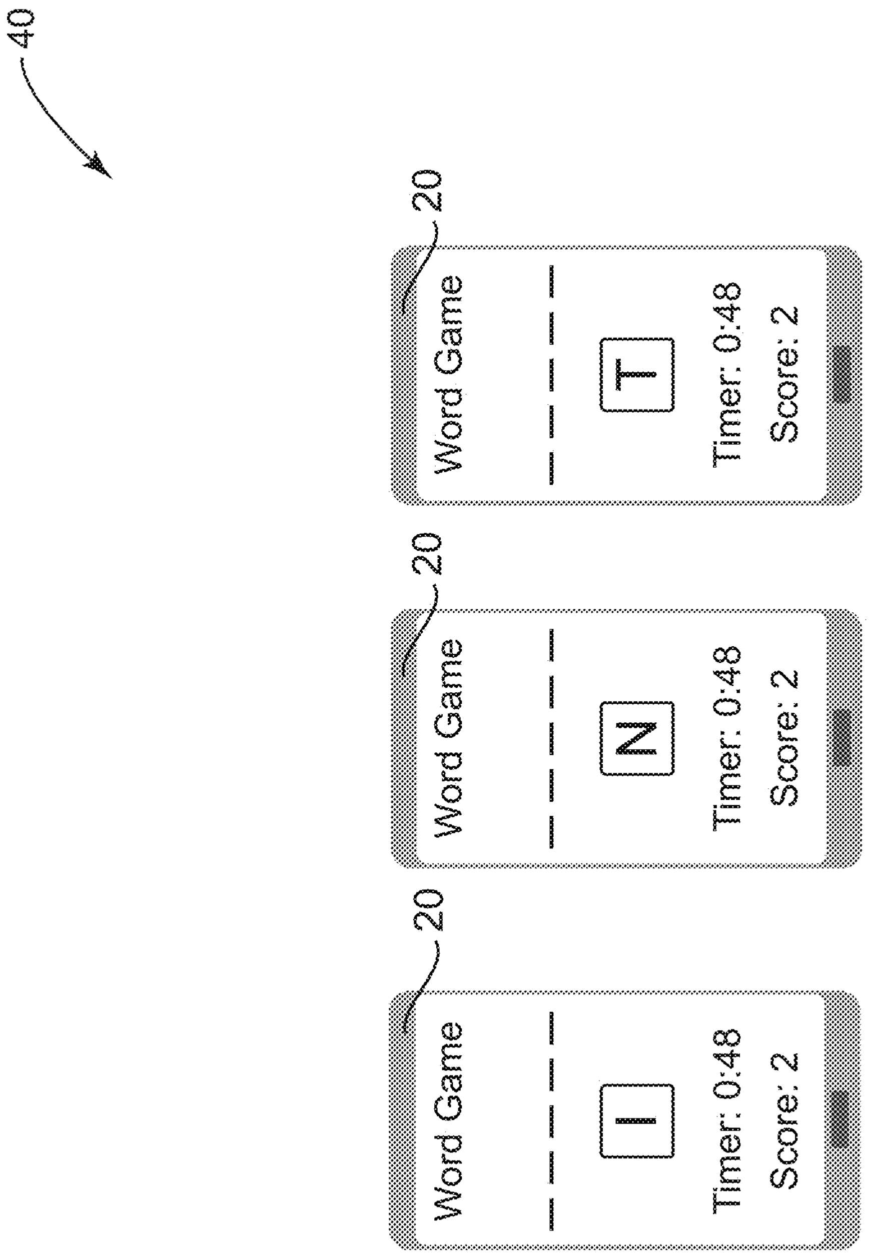
FIG. 10B is a view of user computing devices operating a word game system according to an embodiment.

The game operates as shown in FIGS. 2A-2C, wherein the game interface may include, without limitation, letter tiles, a timer, a score and blank spaces for creating a word (see FIG. 2A). Users of the user computing devices 20 then determine together what word can be formed by the letter tiles on each of the phone. In order to know what the letter tiles, are, each user may look at all of the phones at the same time. The number letter tiles correspond to the number of blank spaces on the game interface to form a word. As shown in FIG. 2A, the number of blank spaces is five, the number of user computing devices 20 is five and the number of letter tiles is five. In embodiments, the server 30 may be programmed to send blank spaces and letter tiles in the same number as the user computing devices 20 forming team 40. For example and without limitation, if there are four user computing devices 20 that form team 40, as shown in FIG. 10A, then there would be four blank spaces; if there are three user computing devices 20 that form team 40, as shown in FIG. 10B, then there would be three blank spaces; if there are six user computing devices 20 (not shown) that form team 40, then there would be 6 blank spaces, and so forth.

Figure 4:
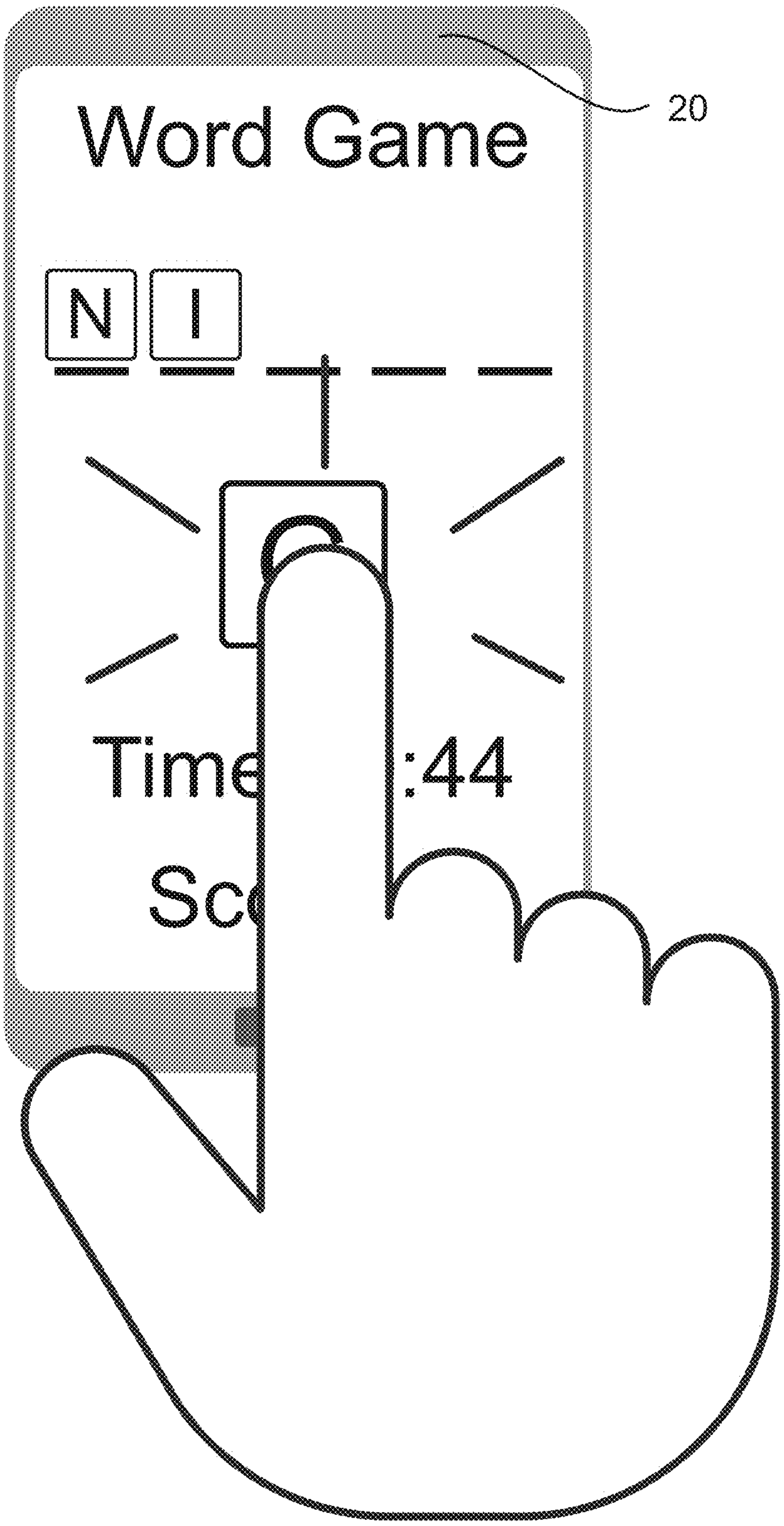
FIG. 4 is a view of a user computing device operating a word game system according to an embodiment.
Figure 5:
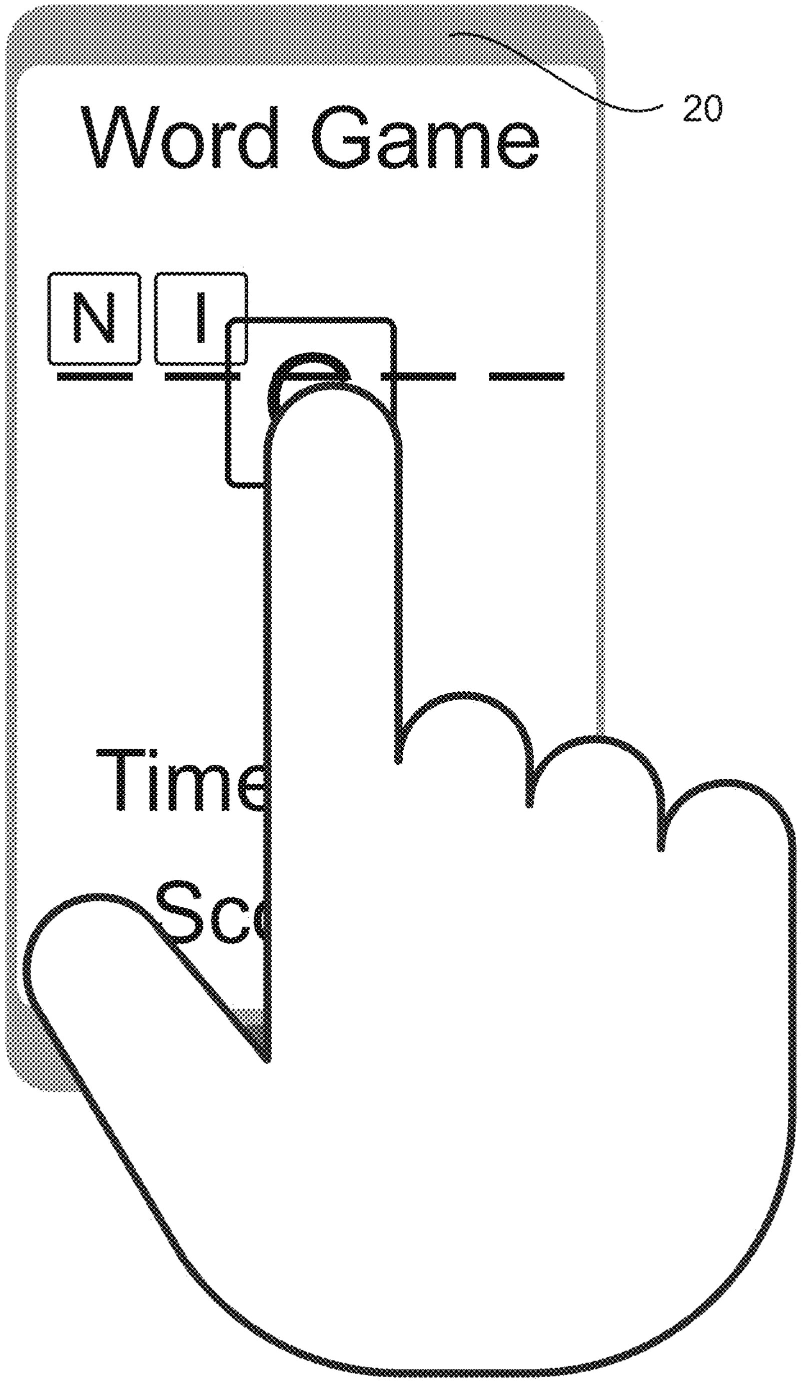
FIG. 5 is a view of a user computing device operating a word game system according to an embodiment.

The users of the user computing devices 20 of team 40 may then select the letter tiles that go into each blank space to form a word, as shown in FIG. 2B. Referring additionally to FIGS. 4 and 5, various methods of entering letter tiles into the blank spaces may be employed by the system. For example, one way is depicted in FIG. 4, wherein user tap on the letter tiles in the order that they want them entered into the blank spaces. FIG. 4 shows that users of user computing devices depicting the "N" tile and the "I" tile have already tapped their tiles and entered them into the blank spaces and the user computing device with the "G" tile is then tapping the letter tile in order to input it into the third blank space. This tapping of letters on each device proceeds until the blank spaces are filled, one space by each user computing device 20. Another example may be each user selecting and dragging the letter to the blank space, as shown in FIG. 5. In embodiments depicted in FIG. 5, each user may drag their tile to the decided on blank space simultaneously in some embodiments, or one at a time in other embodiments. As the team 40 is doing this, the timer is operating and either counting down as shown, or counting up.

In some embodiments, as shown in FIG. 2B, once a letter tile has been selected and entered into the blank spaces, the game interface may have an indication that those letter tiles have been used, such as, but not limited to, greying out the letter tiles, as shown in FIG. 2B, or by some other visual indication. Once all of the letter tiles are placed, one tile by each user computing device 20 of the team 40, the server 30 determines is the word matches the intended word associated with the blank spaces sent by the server 30 on the user computing devices 20. If the word matches the intended word as determined by the server 30, then the server sends an alert indicating whether the word is correct, such as, but not limited to, illuminating the screen of each user computing device 20 with a green color for a correct word (See FIG. 2C) or illuminating the screen of each user computing device 20 with a red color for an incorrect word (see FIG. 3A). During game play, the timer is still counting down (or alternatively counting up) and the score increments higher for a correct solution (see Timer and Score between FIGS. 2A-2C).

Figure 3A:
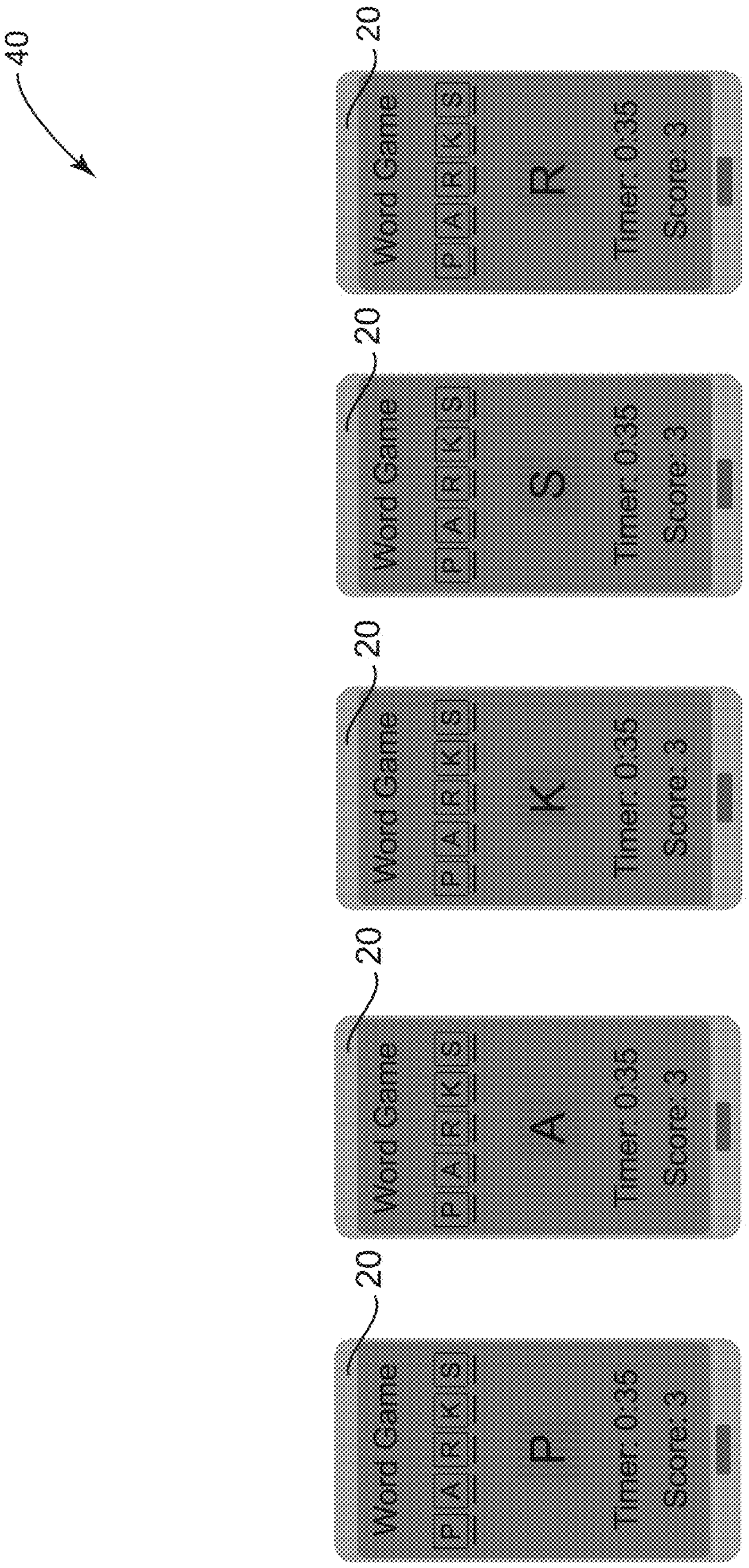
FIG. 3A is a view of user computing devices operating a word game system according to an embodiment.
Figure 3B:
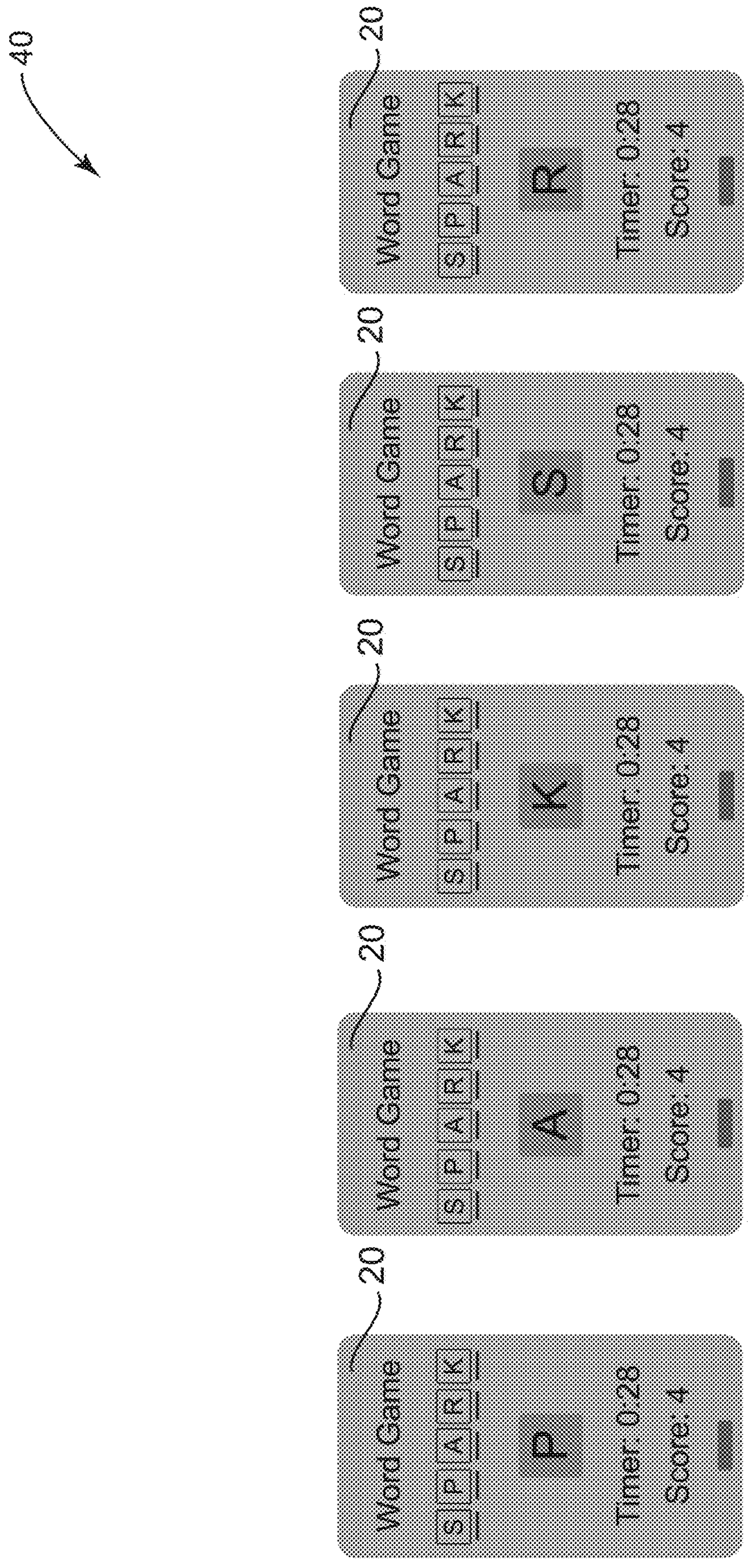
FIG. 3B is a view of user computing devices operating a word game system according to an embodiment.

If the word is correct, as shown in FIG. 2C, the server 30 may then send a new word in the form of blank spaces and letter tiles to the user computing devices 20 of the team 40, as shown in FIGS. 3A-3B. The game play continues as described in FIGS. 2A-2C. If the team 40 gets the word incorrect, such as that shown in FIG. 3A, the server 30 sends and indicator, such as color red illumination of the screens of the user computing devices 20. The timer continues to run and the score does not increment for an incorrect answer. The team 40 may then utilize the same letter tiles to spell a different word. If it is correct, the score increments in response to the server 30 sending an indication of a correct word, such as a green screen illumination of the user computing devices 20. Game play continues in this way until the timer expires by either counting down to zero or counting up to a predetermined time. In embodiments, the total score may then be stored in the server 30. This may be used to then determine the standings of all teams that play and can be parsed by skill level, on word length (i.e. 5 letter, 6 letter, etc.), and so forth.

Figure 6:
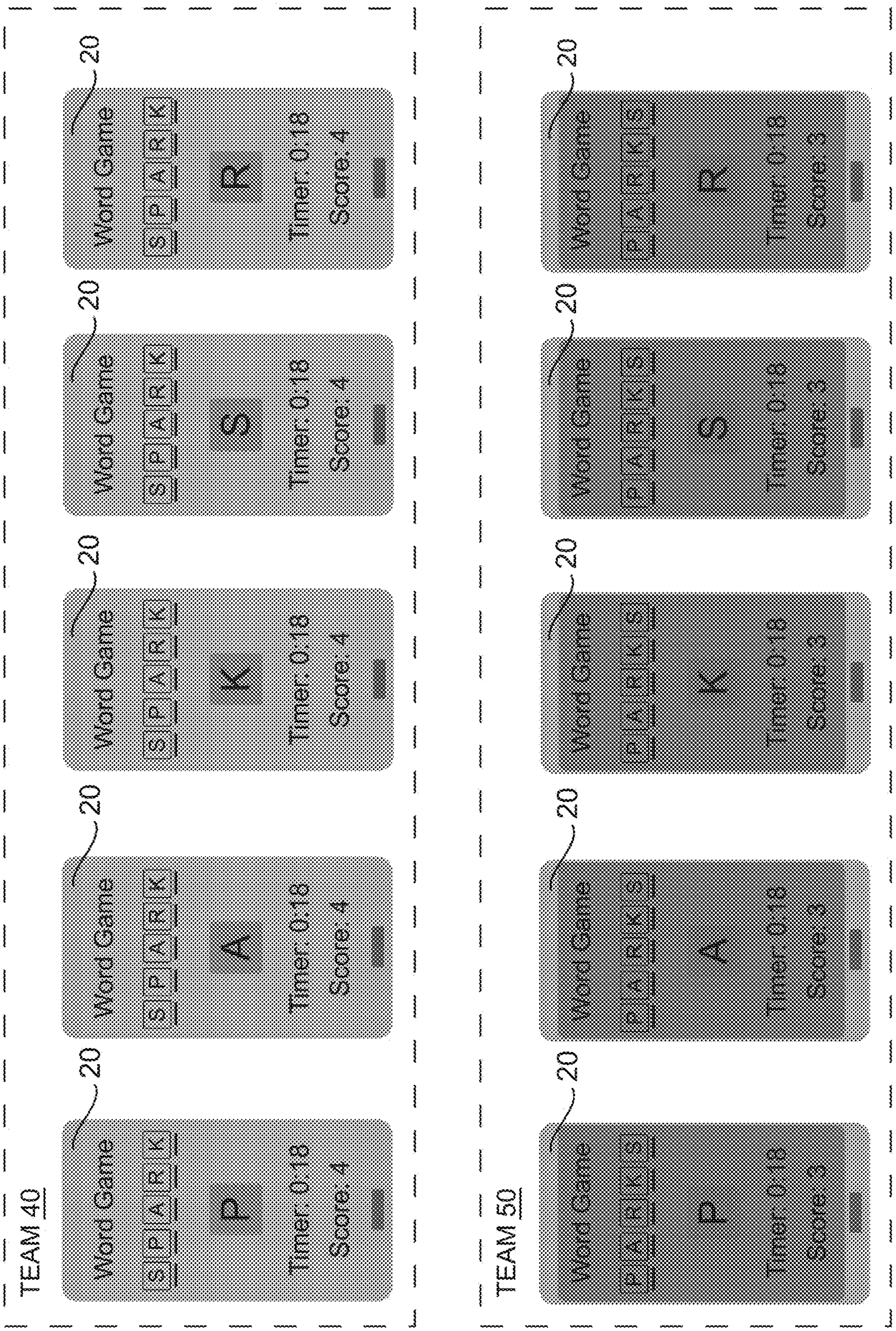
FIG. 6 is a view of user computing devices operating a word game system in competing teams according to an embodiment.
Figure 7:
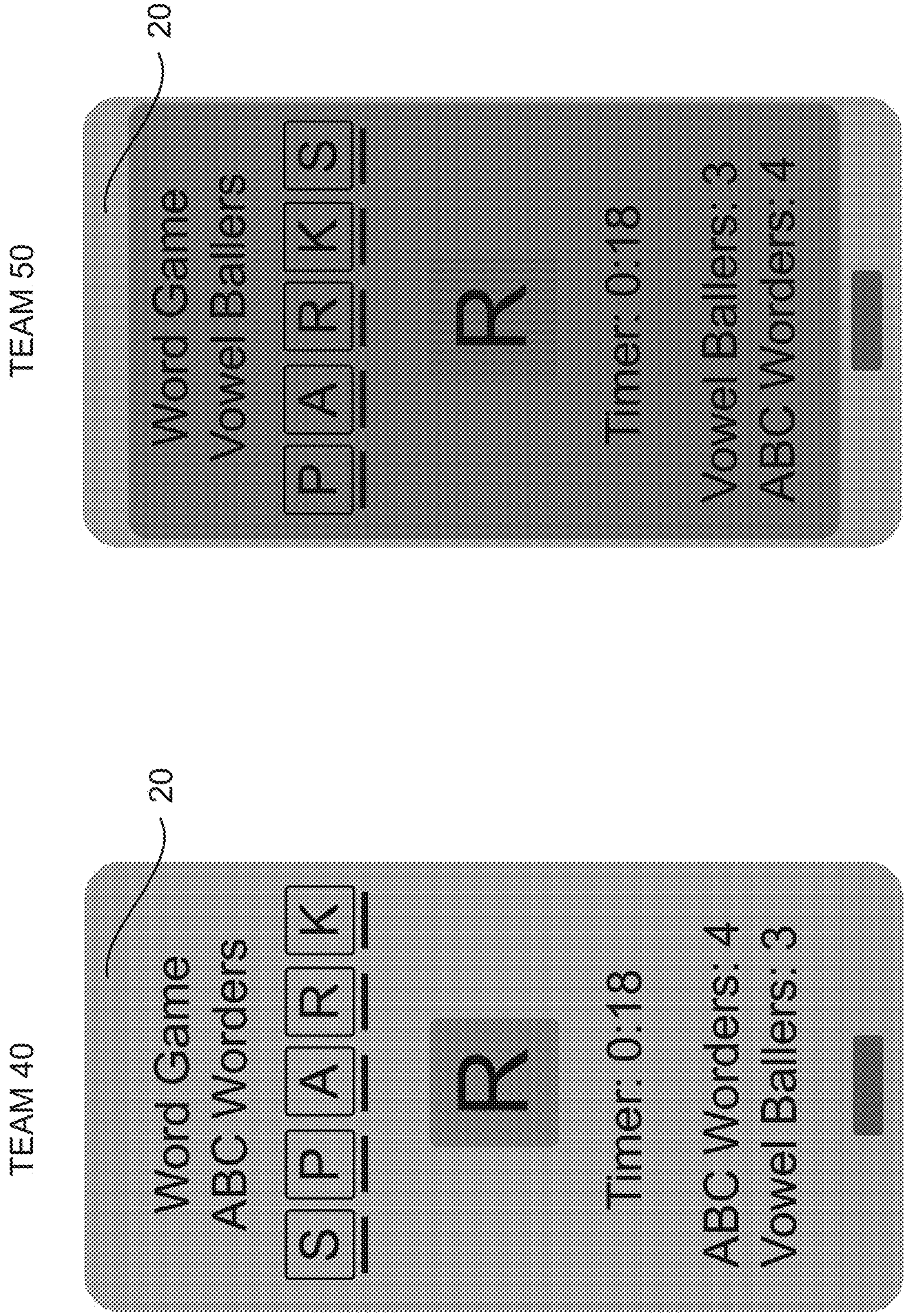
FIG. 7 is a view of user computing devices operating a word game system in competing teams according to an embodiment
Figure 8:
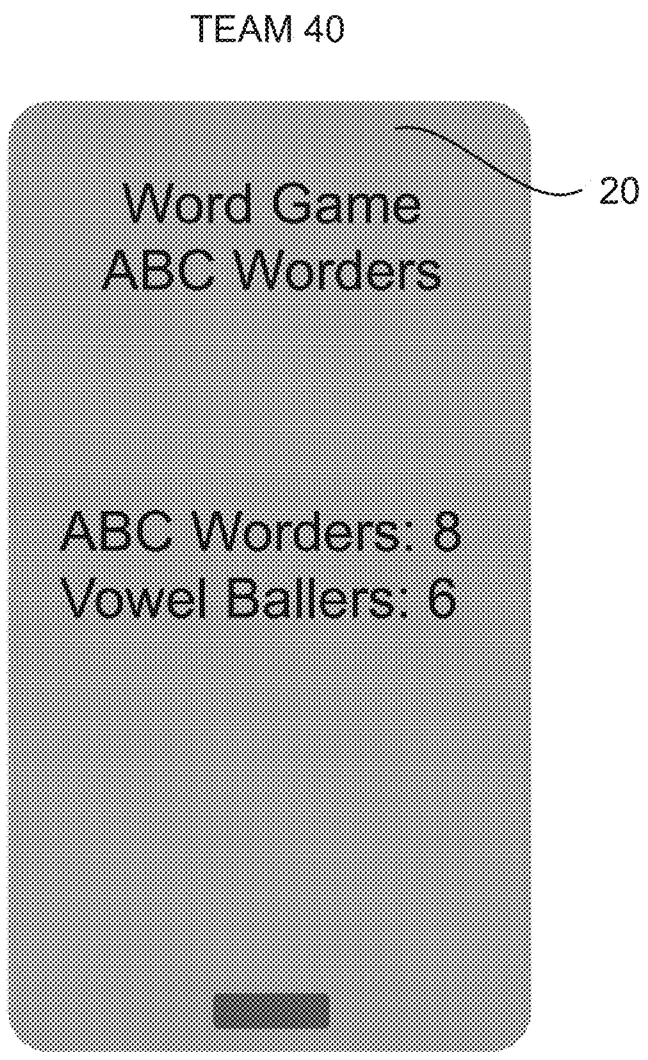
FIG. 8 is a view of a user computing device operating a word game system in competing teams according to an embodiment.

The word game system 10 may have the option to operate in the mode as described in FIGS. 2A-3B or may have an option for a local game between teams, as shown in FIG. 6. In this embodiment, the user computing devices 20 may all be in the same location and may indicate what the teams should be, thereby creating first team 40 and second team 50. The teams 40 and 50 operate to enter words that are the same words given in the same order. Each team operates the system as depicted and described with reference to FIGS. 2A-8. Wherein entering a correct word increments the score with an indication of a correct word (green screen) as shown with respect to first team 40 of FIG. 6 and entering an incorrect word does not increment score with an indication of an incorrect word (red screen) as shown with respect to second team 50 of FIG. 6. Game play continues as described until the timer ends, wherein the timer is the same for both teams 40 and 50. As shown in FIG. 7, embodiments may depict the score for each team that is competing and so all players can see the current score between the teams. The team with the highest score at expiration of the timer is the winner, as shown in FIG. 8.

Figure 1B:
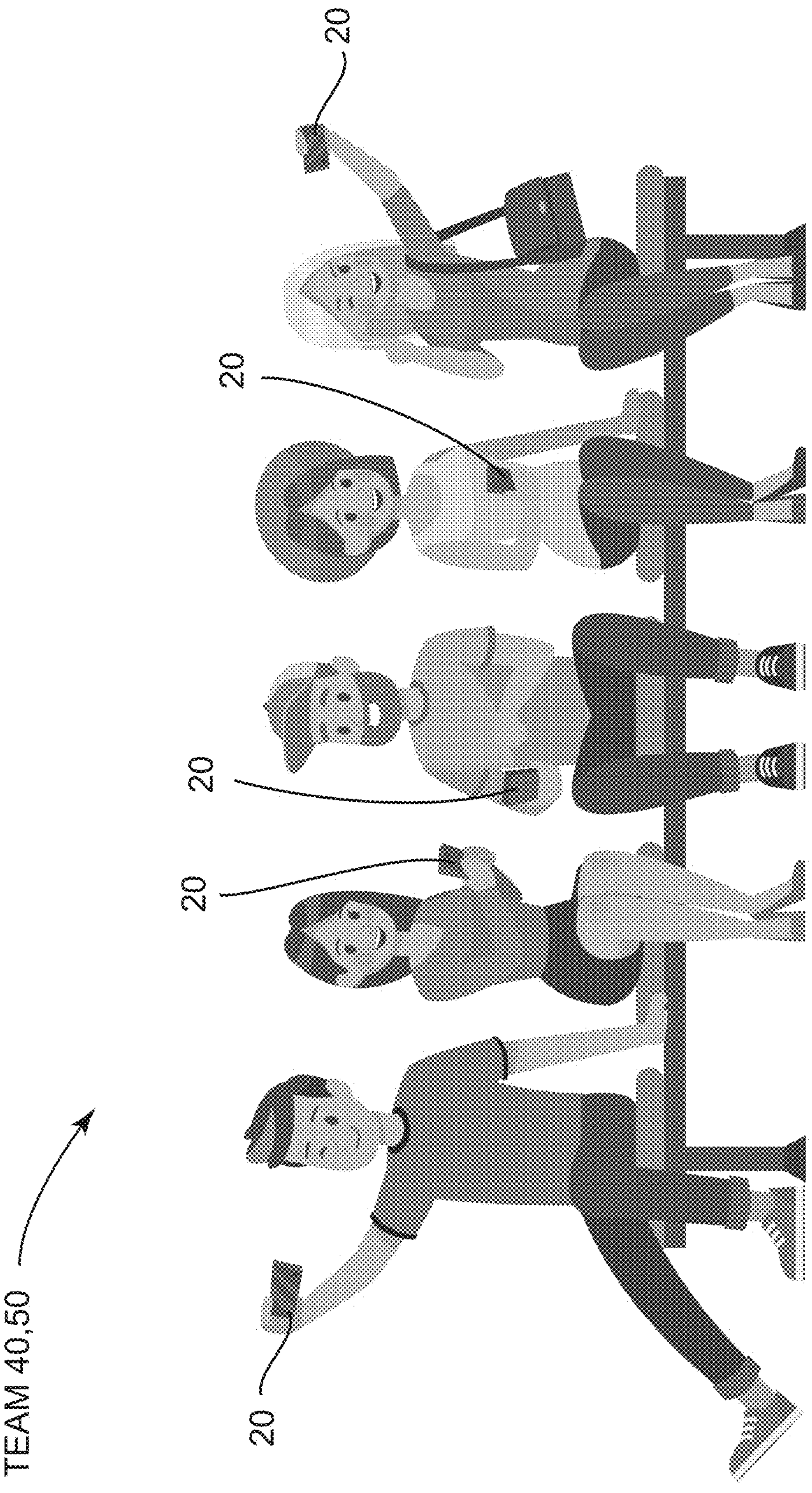
FIG. 1B depicts a team in a same location with user computing devices operating a word game system according to an embodiment.
Figure 1C:
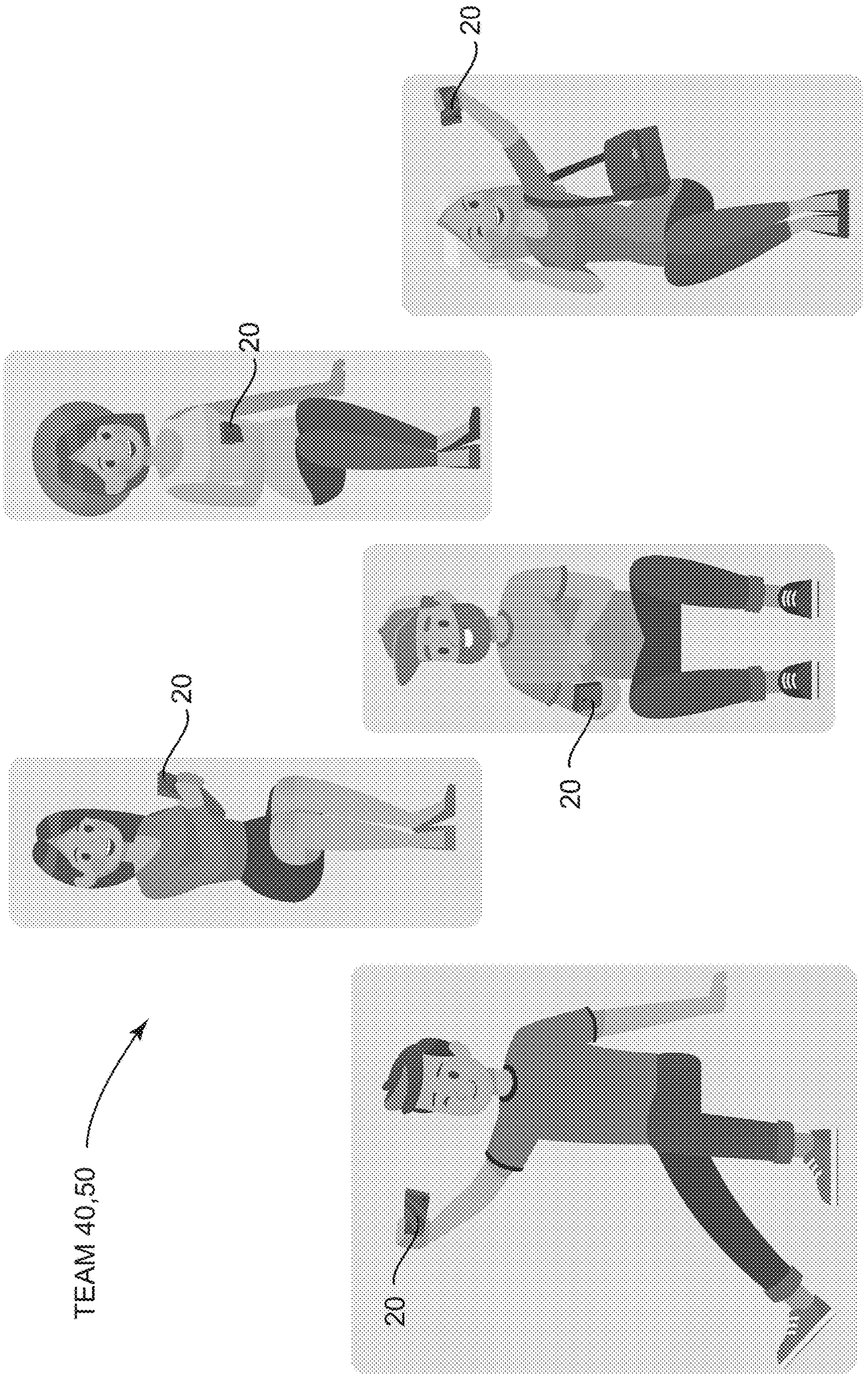
FIG. 1C depicts a team in a different locations with user computing devices operating a word game system according to an embodiment.

It will be understood that in some embodiments, members of the teams 40 or 50 may be located at a same location, as shown in FIG. 1A. In these embodiments, the team members would work together viewing each other's phones to see the letter tile on that phone in order to make determinations on words. In other embodiments, members of the teams 40 or 50 may be located in different locations and connected to each other through the system as a team, as shown in FIG. 1B. In these embodiments, the teams 40 and 50 may have another form of communication between the team members, such as text, voice or video call in order to communicate the tile on their phone and then work together to form the word guesses of the game.

Figure 9:
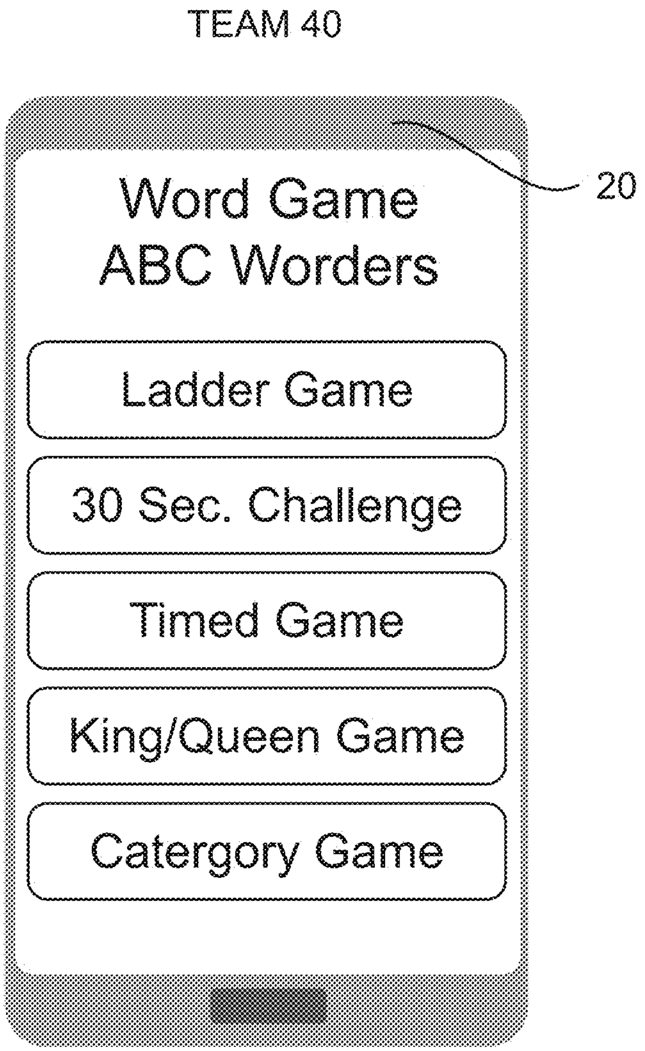
FIG. 9 is a view of a user computing device operating a word game system in competing teams according to an embodiment.

Referring further to the drawings, other embodiment may provide for various games may be played, as shown in FIG. 9, wherein users and teams can select various game types to play. For example, as depicted in FIG. 9, a game may include "Ladder Game" wherein teams compete against other teams of certain skill level and as they win, they are able to move up a ladder rung to compete against harder competition and if they lose, they can move down to compete against weaker competition. The game may include "30 Second Challenge," wherein teams compete to get the highest score in thirty seconds. The game may include "Timed Game" wherein teams compete against each other for a predetermined time limit and the team with the most points wins. The game may include "King/Queen of the Game" wherein teams compete and the seek to see who can hold the tope spot for the longs number of rounds in a game with a predetermined number of rounds. The game may include "Category Game" wherein teams to compete to see if they can correctly guess a preset list of words in a certain category, wherein the timer counts up and the fastest team to correctly guess the words in the entire preset list wins. Other games may be possible using the same basic functionality of the system.

Embodiments may be available on or through the internet, such as through domain names reserved and owned by Applicant that include word-slide.com, wordfliper.com or the like.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A word game system comprising:
- a server having a memory storing user data and game data; and
- a plurality of user computing devices coupled to the server, wherein the server is programmed to:
  - receive a signal from the plurality of user computing devices comprising user data for each user computing device and location information of each user computing device;
  - in response to receiving the signal from the plurality of user computing devices, process the user data and location data for each user computing device and establish a team formed of the plurality of user computing devices accessing the system within a predetermined proximity to each other;
  - create and send for display on each of the plurality of user computing devices a game interface, wherein the game interface comprises blank spaces corresponding to letters of a word determined by the server, a timer, a score and letter tiles corresponding to the blank spaces, one letter tile per user computing device, and wherein the timer begins counting down;
  - synchronize the display of the game interface across all user computing devices in real-time;
  - receive input of letter tiles into the blank spaces to form a word; and
  - process the letter tile input into the blank spaces and compare to the word to determine if the team entered a correct word.

2. The system of claim 1, wherein the server is further programmed to display on the plurality of user computing devices a visual indication that the word is incorrect if the server determined the team entered an incorrect word.

3. The system of claim 1, wherein the server is further programmed to increment a score on the plurality of user computing devices if the word is correct.

4. The system of claim 3, wherein the server is further programmed to display on the plurality of user computing devices a visual indication that the word is correct.

5. The system of claim 4, wherein the server is further programmed to, in response to the team entering the correct word, update the game interface with a new set of blank spaces corresponding to letters of a new word determined by the server, and new letter tiles corresponding to the new set of blank spaces, one new letter tile per user computing device.

6. The system of claim 5, wherein the server is further programmed to end the game when the timer ends.

7. A word game system comprising:
- a server having a memory storing user data and game data; and
- a plurality of user computing devices coupled to the server, wherein the server is programmed to:
  - receive a signal from the plurality of user computing devices comprising user data for each user computing device and a team code;

in response to receiving the signal from the plurality of user computing devices, process the user data and the team for each user computing device and establish a team formed of the plurality of user computing devices accessing the system with the same team code;

create and send for display on each of the plurality of user computing devices a game interface, wherein the game interface comprises blank spaces corresponding to letters of a word determined by the server, a timer, a score and letter tiles corresponding to the blank spaces, one letter tile per user computing device, and wherein the timer begins counting down;

synchronize the display of the game interface across all user computing devices in real-time;

receive input of letter tiles into the blank spaces to form a word; and process the letter tile input into the blank spaces and compare to the word to determine if the team entered a correct word.

8. The system of claim 7, wherein the server is further programmed to display on the plurality of user computing devices a visual indication that the word is incorrect if the server determined the team entered an incorrect word.

9. The system of claim 7, wherein the server is further programmed to increment a score on the plurality of user computing devices if the word is correct.

10. The system of claim 9, wherein the server is further programmed to display on the plurality of user computing devices a visual indication that the word is correct.

11. The system of claim 10, wherein the server is further programmed to, in response to the team entering the correct word, update the game interface with a new set of blank spaces corresponding to letters of a new word determined by the server, and new letter tiles corresponding to the new set of blank spaces, one new letter tile per user computing device.

12. The system of claim 11, wherein the server is further programmed to end the game when the timer ends.

13. A word game system comprising:

a server having a memory storing user data and game data; and a plurality of user computing devices coupled to the server, wherein the server is programmed to:

receive a signal from the plurality of user computing devices comprising user data for each user computing device;

in response to receiving the signal from the plurality of user computing devices, process the user data and establish a team formed of the plurality of user computing devices accessing the system;

create and send for display on each of the plurality of user computing devices a game interface, wherein the game interface comprises blank spaces corresponding to letters of a word determined by the server, a score, and letter tiles corresponding to the blank spaces, one letter tile per user computing device;

synchronize the display of the game interface across all user computing devices in real-time;

receive input of letter tiles from each of the plurality of user computing devices into the blank spaces to form a word; and process the letter tile input into the blank spaces and determine if the team entered a correct word.

* * * * *